United States Patent
Zhang et al.

(10) Patent No.: US 9,049,706 B2
(45) Date of Patent: Jun. 2, 2015

(54) METHOD, DEVICE AND SYSTEM FOR RELAY TIMING ADJUSTMENT

(75) Inventors: Wenjian Zhang, Beijing (CN); Libo Wang, Beijing (CN); Zukang Shen, Beijing (CN); Xueming Pan, Beijing (CN); Guojun Xiao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 161 days.

(21) Appl. No.: 13/701,401

(22) PCT Filed: Aug. 4, 2011

(86) PCT No.: PCT/CN2011/078017
§ 371 (c)(1),
(2), (4) Date: Feb. 11, 2013

(87) PCT Pub. No.: WO2012/019523
PCT Pub. Date: Feb. 16, 2012

(65) Prior Publication Data
US 2013/0142106 A1    Jun. 6, 2013

(30) Foreign Application Priority Data
Aug. 11, 2010 (CN) .......................... 2010 1 0251155

(51) Int. Cl.
*H04B 7/14* (2006.01)
*H04W 72/04* (2009.01)
(Continued)

(52) U.S. Cl.
CPC ............. *H04W 72/042* (2013.01); *H04B 7/155* (2013.01); *H04W 56/0015* (2013.01); *H04W 92/10* (2013.01)

(58) Field of Classification Search
CPC . H04W 24/00; H04W 24/02; H04W 56/0015; H04W 72/042; H04W 92/10
See application file for complete search history.

(56) References Cited

U.S. PATENT DOCUMENTS

2007/0087691 A1   4/2007   Lee et al.
2008/0186950 A1   8/2008   Zhu et al.
(Continued)

FOREIGN PATENT DOCUMENTS

| CN | 101123468 A | 2/2008 |
| CN | 102088763 A | 6/2011 |
| WO | WO-2010/036008 A2 | 4/2010 |

OTHER PUBLICATIONS

International Search Report in PCT/CN2011/078017 mailed Nov. 10, 2011.
(Continued)

*Primary Examiner* — David Oveissi
(74) *Attorney, Agent, or Firm* — Marshall, Gerstein & Borun LLP

(57) ABSTRACT

An embodiment of the present application provides a relay timing adjustment method, system and device, relating to the technical field of wireless communications, for use in solving the problem of how to synchronize base station downlink transmission and relay device downlink transmission in an Advanced Long Term Evolution (LTE-A) system. In this application, the base station sends an access downlink transmission timing adjustment command to the relay device. When the relay device receives said access downlink transmission timing adjustment command, the downlink transmission timing is adjusted in said relay device according to said received access downlink transmission timing adjustment command. This invention is thus able to synchronize relay device access downlink transmission timing with base station downlink transmission timing.

18 Claims, 6 Drawing Sheets

(51) Int. Cl.
*H04W 56/00* (2009.01)
*H04B 7/155* (2006.01)
*H04W 92/10* (2009.01)

(56) References Cited

U.S. PATENT DOCUMENTS

2010/0111070 A1 5/2010 Hsu
2011/0243261 A1* 10/2011 Bienas et al. .................. 375/260
2012/0014371 A1* 1/2012 Weng et al. .................... 370/350

OTHER PUBLICATIONS

"Design of Relay Frame Timing in LTE-A," 3GPP TSG RAN WG1 Meeting #60bis, Beijing, China, Apr. 12-16, 2010, 8 pages.
"Timing Alignment of DL Backhaul," 3GPP TSG RAN WG1 Meeting #60bis, Beijing, China, Apr. 12-16, 2010, 4 pages.

* cited by examiner

METHOD, DEVICE AND SYSTEM FOR RELAY TIMING ADJUSTMENT this application is a U.S. National Stage of International Application No. PCT/CN2011/078017 filed 4 Aug. 2011, designating the United States, and claiming priority from Chinese patent Application No. 201010251155.4 filed with the Chinese patent Office on Aug. 11, 2010 and entitled "Method, Device and System for Relay Timing Adjustment", which is herein incorporated by reference in its entirety.

FIELD OF THE INVENTION

The present invention relates to the technical field of wireless communications and particularly to a relay timing adjustment method, system and device.

BACKGROUND OF THE INVENTION

In an Advanced Long Term Evolution (LTE-A) system, in order to improve the throughput of the system and expand the coverage of a network, a Relay Node (RN) is introduced, and as illustrated in FIG. 1, an evolved Node B (eNB) is connected to a Core Network (CN) via a wired interface, and an RN is connected to the eNB via a wireless interface; a User Equipment (UE) is connected to the RN or the eNB via a wireless interface. A link between the RN and the eNB is referred to as a backhaul link, and a link between the RN and the UE is referred to as an access link.

A certain time delay is required for transmission of a signal sent from the eNB to the RN over the backhaul link in both a Time Division Duplex (TDD) system and a Frequency Division Duplex (FDD) system, and the time delay is related directly to the distance between the eNB and the RN. From the perspective of the RN side, a downlink signal received over the backhaul link is subjected to this delay, as illustrated in FIG. 2.

As can be seen from FIG. 2, synchronized initialization and synchronized tracking with the downlink of the eNB is performed in the downlink of the relay backhaul link through a downlink signal (e.g., a primary synchronization signal, a secondary synchronization signal and a pilot signal) transmitted from the eNB.

FIG. 3 illustrates a downlink transmission time of an RN access link synchronized with a downlink receipt time of an RN backhaul link. Downlink transmission of the eNB may not be synchronized with downlink transmission of the RN if the RN is considered as a separate eNB.

The inventors have discovered the following technical problem in the prior art during implementing the invention:

Downlink transmission of the eNB may not be synchronized with downlink transmission of the RN and also a specific solution to synchronizing downlink transmission of the eNB with downlink transmission of the RN has been absent at present.

SUMMARY OF THE INVENTION

Embodiments of the invention provide a relay timing adjustment method, system and device so as to address the problem of how to synchronize downlink transmission of an eNB with downlink transmission of an RN in the LTE-A system.

A method of transmitting a timing adjustment command in the LTE-A system includes:

transmitting, by a base station, a downlink transmission timing adjustment command of an access link to a relay node; and the downlink transmission timing adjustment command of the access link is a command by which the relay node adjusts its own downlink transmission timing so that the downlink transmission timing of the access link of the relay node is synchronized with downlink transmission timing of the base station.

A method of downlink synchronization in the LTE-A system includes:

receiving, by a relay node, a downlink transmission timing adjustment command of an access link transmitted from a base station; and adjusting, by the relay node, downlink transmission timing of the present relay node according to the downlink transmission timing adjustment command of the access link.

A base station includes:

a downlink adjustment command generation unit configured to generate a downlink transmission timing adjustment command of an access link, wherein the downlink transmission timing adjustment command of the access link is a command by which a relay node adjusts its own downlink transmission timing so that the downlink transmission timing of the access link of the relay node is synchronized with downlink transmission timing of the base station; and a downlink adjustment command transmission unit configured to transmit the downlink transmission timing adjustment command of the access link to the relay node.

A relay node includes:

a downlink adjustment command reception unit configured to receive a downlink transmission timing adjustment command of an access link transmitted from a base station; and a downlink transmission timing adjustment unit configured to adjust downlink transmission timing of the present relay node according to the downlink transmission timing adjustment command of the access link.

An LTE-A communication system includes:

a base station configured to transmit a downlink transmission timing adjustment command of an access link to a relay node; and the relay node configured to receive the downlink transmission timing adjustment command of the access link and to adjust downlink transmission timing of the present relay node according to the downlink transmission timing adjustment command of the access link.

In the inventive solutions, the base station transmits a downlink transmission timing adjustment command of an access link to a relay node, wherein the downlink transmission timing adjustment command of the access link is a command by which the relay node adjusts its own downlink transmission timing so that the downlink transmission timing of the access link of the relay node is synchronized with downlink transmission timing of the base station; and the relay node receives the downlink transmission timing adjustment command of the access link and adjusts the downlink transmission timing of the present relay node according to the downlink transmission timing adjustment command of the access link. As can be apparent in the invention, the base station transmits the downlink transmission timing adjustment command of the access link, and the relay nodes adjusts the downlink transmission timing of the present relay node according to the downlink transmission timing adjustment command of the access link so that downlink transmission of

DETAILED DESCRIPTION OF THE EMBODIMENTS

In order to address the problem of how to synchronize downlink transmission of an eNB with downlink transmission of an RN in the LTE-A system, an embodiment of the invention provides a method of transmitting a timing adjustment command in the LTE-A system, and in this method, a base station transmits a downlink transmission timing adjustment command of an access link to a relay node, and the relay node adjusts downlink transmission timing of the present relay node according to the downlink transmission timing adjustment command of the access link to ensure synchronization of the downlink transmission timing of the access link of the relay node with downlink transmission timing of the base station.

Figure 1:
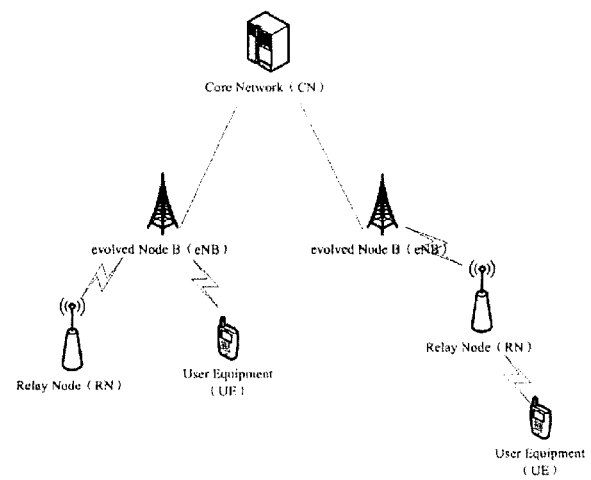
FIG. 1 is a schematic diagram of the LTE-A system in the prior art.
Figure 2:
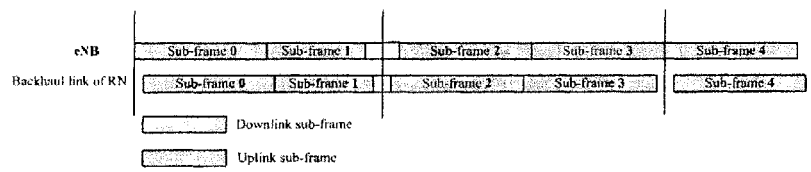
FIG. 2 is a schematic diagram of a time delay at which a relay node receives a downlink signal over a backhaul link in the prior art.
Figure 3:
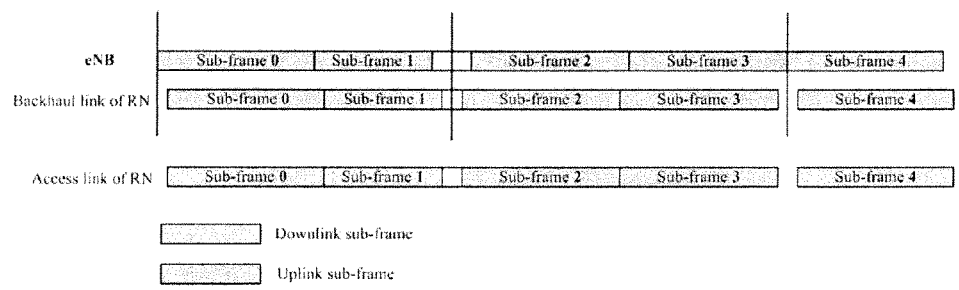
FIG. 3 illustrates a timing relationship between an access link and a backhaul link in the prior art.
Figure 4:
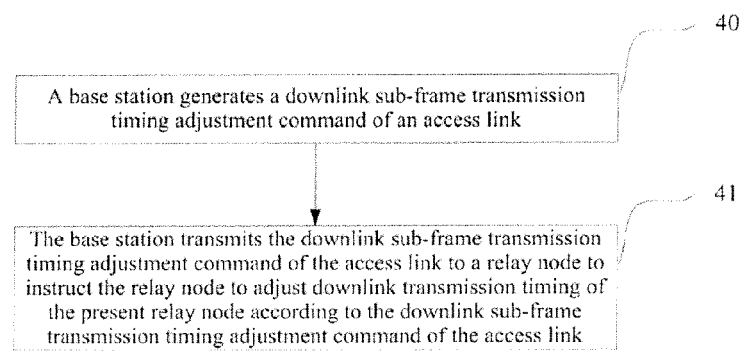
FIG. 4 is a schematic flow chart of a method according to an embodiment of the invention.

Referring to FIG. 4, a method of transmitting a timing adjustment command in the LTE-A system according to an embodiment of the invention particularly includes the following steps:

Step 40: A base station generates a downlink transmission timing adjustment command of an access link, wherein the downlink transmission timing adjustment command of the access link is a command by which a relay node adjusts its own downlink transmission timing so that the downlink transmission timing of the access link of the relay node is synchronized with downlink transmission timing of the base station.

Here, when receiving a signal transmitted from the relay node, the base station can generate the downlink transmission timing adjustment command of the access link according to a reception time when the signal is received. Of course, the base station can alternatively generate the downlink transmission timing adjustment command of the access link on any other occasion when the downlink transmission timing of the relay node is required to be adjusted, for example, the base station adjusts the downlink transmission timing of a backhaul link and then shall also adjust the downlink transmission timing of the relay node in order to ensure synchronization of the downlink transmission timing of the access link of the relay node with the downlink transmission timing of the base station, and thus generates the downlink transmission timing adjustment command of the access link to be transmitted to the relay node.

Step 41: The base station transmits the downlink transmission timing adjustment command of the access link to the relay node to instruct the relay node to adjust the downlink transmission timing of the present relay node according to the downlink transmission timing adjustment command of the access link.

In the step 40, the base station can generate the downlink transmission timing adjustment command of the access link according to the time when the signal transmitted from the relay node is received, particularly in the following three scenarios:

In a first scenario, the base station generates the downlink transmission timing adjustment command of the access link according to a reception time when a random access signal is received, which is transmitted over a Physical Random Access Channel (PRACH) from the relay node in an initial access procedure.

In a second scenario, the base station transmits a random access instruction command to the relay node before generating the downlink transmission timing adjustment command of the access link; the relay node transmits a random access signal to the base station over a PRACH after receiving the random access instruction command; and the base station generates the downlink transmission timing adjustment command of the access link according to a reception time when the random access signal is received.

In a third scenario, the base station generates the downlink transmission timing adjustment command of the access link according to a reception time when another signal, than a random access signal, transmitted from the relay node is received. For example, the downlink transmission timing adjustment command of the access link is generated according to a reception time when a signal which is transmitted from the relay node after accomplishing initial access is received.

In the step 40, the base station can generate the downlink transmission timing adjustment command of the access link particularly as follows:

Firstly, the base station determines a time difference $\Delta_{DL}$ between the time when the signal transmitted from the relay node in an uplink sub-frame k is received and a starting time of the sub-frame k of the present base station;

Then, the base station quantifies the time difference $\Delta_{DL}$ or a half of the time difference $\Delta_{DL}$ by a quantification step to obtain timing advance quantification data; for example, the half of the time difference $\Delta_{DL}$ can be quantified in Formula 1 below, and the time difference $\Delta_{DL}$ can be quantified in Formula 2 below:

$$\text{Timing advance quantification data} = \text{ceil}\,(\Delta_{DL}/(K/2)),$$
or
$$\text{Timing advance quantification data} = \text{floor}\,(\Delta_{DL}/(K/2)); \quad \text{Formula 1}$$

$$\text{Timing advance quantification data} = \text{ceil}\,(\Delta_{DL}/K), \text{ or}$$
$$\text{Timing advance quantification data} = \text{floor}\,(\Delta_{DL}/K); \quad \text{Formula 2}$$

Wherein ceil represents rounding up to an integer, floor represents rounding down to an integer, and K represents the quantification step. For example, in the 3$^{rd}$ Generation Partnership Project (3GPP) Long Term Evolution (LTE) or LTE- A, the quantification step is 16Ts, where Ts=1/(15000*2048) second represents the minimum time unit of the system.

Finally, the base station generates the downlink transmission timing adjustment command of the access link representing the timing advance quantification data. For example, the timing advance quantification data is presented in 11 (primarily suitable for quantifying the time difference $\Delta_{DL}$) or 6 (primarily suitable for quantifying the half of the time difference $\Delta_{DL}$) binary bits.

Preferably, the base station can revise the time difference by a value d after determining the time difference and before quantifying the time difference or the half of the time difference by the quantification step, wherein d represents a difference between the starting time of the uplink sub-frame k of the backhaul link of the relay node and a starting time of a downlink sub-frame k of the backhaul link of the relay node.

Preferably, the base station can further generate an uplink timing adjustment command according to the time when the signal transmitted from the relay node is received, wherein the uplink timing adjustment command is a command by which the relay node adjusts uplink transmission timing of the backhaul link so that uplink transmission of the backhaul link is kept synchronization with uplink reception of the backhaul link; and the base station transmits the uplink timing adjustment command to the relay node to instruct the relay node to adjust the uplink transmission timing of the backhaul link according to the uplink timing adjustment command.

Here the base station generates the uplink timing adjustment command according to the time when the signal transmitted from the relay node is received, particularly in a similar way to that the base station generates the downlink transmission timing adjustment command of the access link, that is:

Firstly, the base station determines the time difference $\Delta_{DL}$ between the time when the signal transmitted from the relay node in the uplink sub-frame k is received and the starting time of the sub-frame k of the present base station;

Then, the base station quantifies the time difference $\Delta_{DL}$ or a half of the time difference $\Delta_{DL}$ by a quantification step to obtain timing advance quantification data; and Finally, the base station generates the uplink timing adjustment command representing the timing advance quantification data. Here, the number of bits of the uplink timing adjustment command can be different from the number of bits of the downlink transmission timing adjustment command of the access link, and at the same time, a frequency at which the base station transmits the uplink timing adjustment command can be different from a frequency at which the base station transmits the downlink transmission timing adjustment command of the access link.

The base station can transmit the downlink transmission timing adjustment command of the access link to the relay node in a message 2 (msg2) or upper-layer signaling in a random access procedure when the base station generates the downlink transmission timing adjustment command of the access link according to the time when the random access signal is received. The base station can transmit the downlink transmission timing adjustment command of the access link to the relay node in upper-layer signaling when the base station generates the downlink transmission timing adjustment command of the access link according to the time when another signal is received. The upper-layer signaling here includes Radio Resource Control (RRC) signaling or the like.

Figure 5:
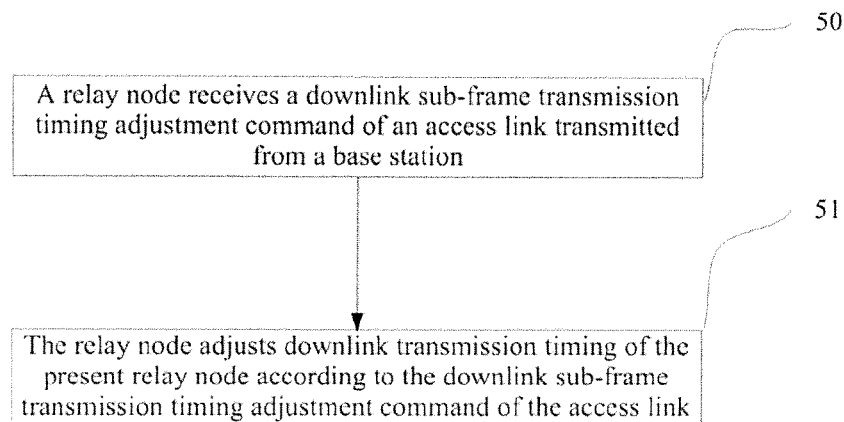
FIG. 5 is a schematic flow chart of another method according to an embodiment of the invention.

Referring to FIG. 5, an embodiment of the invention further provides a method of downlink synchronization in the LTE-A system, which particularly includes the following steps:

Step 50: A relay node receives a downlink transmission timing adjustment command of an access link transmitted from a base station, wherein the downlink transmission timing adjustment command of the access link is a command by which the relay node adjusts its own downlink transmission timing so that downlink transmission of the relay node is kept synchronized with downlink transmission of a backhaul link; and Step 51: The relay node adjusts the downlink transmission timing of the present relay node according to the downlink transmission timing adjustment command of the access link. Specifically the relay node firstly determines a timing advance of downlink transmission of the present relay node according to the downlink transmission timing adjustment command of the access link and then adjusts the downlink transmission timing of the present relay node according to the timing advance.

In the step 51, the relay node can determine the Timing Advance (TA) of downlink transmission of the present relay node in Formula 1 or Formula 2 below if the relay node receives the downlink transmission timing adjustment command of the access link transmitted from the base station after initiating random access over a PRACH:

$$TA=TAC*K; \quad \text{Formula 1}$$

$$TA=TAC*(K/2); \quad \text{Formula 2}$$

Wherein TAC represents timing advance quantification data represented by the downlink transmission timing adjustment command of the access link, and K represents a quantification step used by the base station to derive the timing advance quantification data.

The relay node can determine the TA in Formula 1 when the base station quantifies a half of the time difference $\Delta_{DL}$ by the quantification step, and the relay node can determine the TA in Formula 2 when the base station quantifies the time difference $\Delta_{DL}$ by the quantification step.

In the step 51, the relay node can determine the Timing Advance (TA) of downlink transmission of the present relay node in Formula 3 or Formula 4 below if the relay node receives the downlink transmission timing adjustment command of the access link transmitted from the base station after accomplishing random access:

$$TA=TA_{old}+(TAC-2^{N-1})*K; \quad \text{Formula 3}$$

$$TA=TA_{old}+(TAC-(2^{N-1}-1))*(K/2); \quad \text{Formula 4}$$

Where TAC represents timing advance quantification data represented by the downlink transmission timing adjustment command of the access link, K represents a quantification step used by the base station to derive the timing advance quantification data, N represents the number of bits used by the downlink transmission timing adjustment command of the access link, and $TA_{old}$ represents a timing advance of downlink transmission of the present relay node recently determined by the relay node before receiving the downlink transmission timing adjustment command of the access link. The quantification step can be 16*Ts, where Ts represents the minimum time unit of the LTE-A system. N can be 6 or 11.

The relay node can determine the TA in Formula 3 when the base station quantifies a half of the time difference $\Delta_{DL}$ by the quantification step, and the relay node can determine the TA in Formula 4 when the base station quantifies the time difference $\Delta_{DL}$ by the quantification step.

In the step S51, the relay node can adjust the downlink transmission timing of the present relay node according to the determined Timing Advance (TA) particularly as follows:

If the timing advance is a positive value, the relay node advances the downlink transmission timing of the access link of the present relay node by the magnitude of the TA, and if the timing advance is a negative value, the relay node delays the downlink transmission timing of the access link of the present relay node by the magnitude of −TA.

Specifically the relay node can adjust the downlink transmission timing of the present relay node starting from a sub-frame k+n when receiving the downlink transmission timing adjustment command of the access link in a sub-frame k, where n represents a positive integer. For example, the value of n can be 6.

Preferably, when the base station adjusts the downlink transmission timing of the RN and uplink transmission timing of the backhaul link by a single timing adjustment command, the relay node can determine a timing advance of uplink transmission of the backhaul link according to the downlink transmission timing adjustment command of the access link and adjust the uplink transmission timing of the backhaul link according to the timing advance after the relay node receives the downlink transmission timing adjustment command of the access link.

Preferably, when the base station adjusts the downlink transmission timing of the RN and an uplink transmission timing of the backhaul link respectively by separate commands, the relay node receives an uplink timing adjustment command transmitted from the base station, wherein the uplink timing adjustment command is a command by which the relay node adjusts the uplink transmission timing of the backhaul link so that uplink transmission of the backhaul link is kept synchronization with uplink reception of the backhaul link; and the relay node determines a timing advance of uplink transmission of the backhaul link according to the uplink timing adjustment command and adjusts the uplink transmission timing of the backhaul link according to the timing advance.

The relay node determines the timing advance of uplink transmission of the backhaul link according to the downlink transmission timing adjustment command of the access link particularly in a similar way to that the relay node determines the timing advance of downlink transmission of the present relay node according to the downlink transmission timing adjustment command of the access link. Also the relay node adjusts the uplink transmission timing of the backhaul link according to the timing advance particularly in a similar way to that the relay node adjusts the downlink transmission timing of the present relay node according to the downlink transmission timing adjustment command of the access link.

The invention will be described below in details.

A main idea of the invention lies in that an eNB notifies an RN of a first timing adjustment command $TAC_{DL}$. The RN determines a downlink transmission time of an access link of the RN after receiving the $TAC_{DL}$. The eNB notifies the RN of a second timing adjustment command $TAC_{UL}$. The RN determines an uplink transmission time of a backhaul link of the RN after receiving the $TAC_{UL}$.

Figure 6:
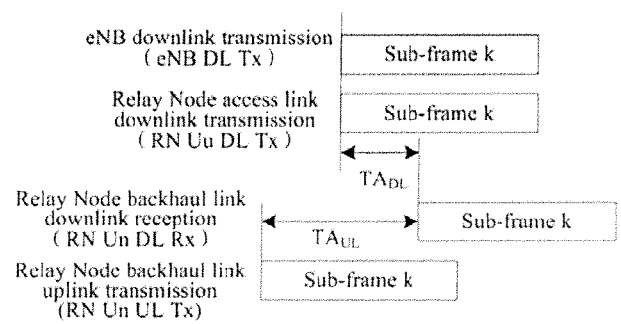
FIG. 6 is a schematic diagram of a solution to synchronizing downlink transmissions in an embodiment of the invention.

Specifically, after receiving the $TAC_{DL}$ of the eNB in a PRACH response message, the RN calculates an advance $TA_{DL}$ of the downlink transmission time of the access link of the RN relative to a downlink reception time of the backhaul link of the RN and determines the downlink transmission time of the access link of the RN according to the downlink reception time of the backhaul link of the RN and the $TA_{DL}$, as illustrated in FIG. 6, wherein Un represents the backhaul link.

Specifically, after receiving the $TAC_{UL}$ of the eNB, the RN calculates an advance $TA_{UL}$ of the uplink transmission time of the backhaul link of the RN relative to the downlink reception time of the backhaul link of the RN and determines the uplink transmission time of the backhaul link of the RN according to the downlink reception time of the backhaul link of the RN and the $TA_{UL}$, as illustrated in FIG. 6, wherein Uu represents the access link.

Figure 7:
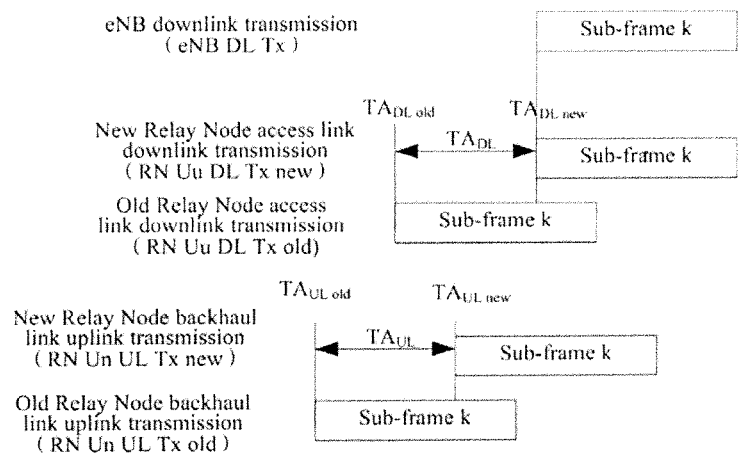
FIG. 7 is a schematic diagram of another solution to synchronizing downlink transmissions in an embodiment of the invention.

Specifically as illustrated in FIG. 7, the RN receives the $TAC_{DL}$ of the eNB in a non-PRACH response message, and a time adjustment corresponding to the command is the $TA_{DL}$ which is a time adjustment between current timing $TA_{DLold}$ and new timing $TA_{DLnew}$. Namely the new downlink transmission timing of the access link is determined according to the current downlink transmission timing of the access link and the time adjustment $TA_{DL}$. The positive or negative $TA_{DL}$ can be used to represent an advance or a delay, that is, the current timing is advanced by the magnitude of the $TA_{DL}$ if the $TA_{DL}$ is a positive value; and the current timing is delayed by the magnitude of −$TA_{DL}$ if the $TA_{DL}$ is a negative value.

Figure 8:
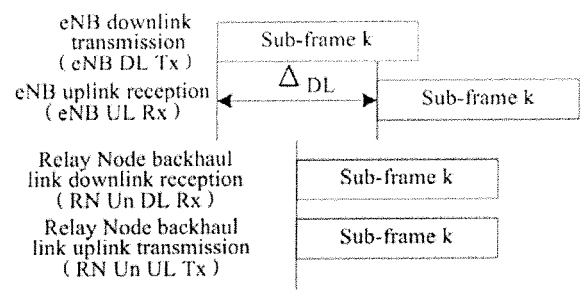
FIG. 8 is a schematic diagram of determination of a TAC in an embodiment of the invention.

The base station can determine the $TAC_{DL}$ over a PRACH transmitted from the relay node, as illustrated in FIG. 8. The RN transmits the PRACH in an uplink sub-frame k of the backhaul link, and a transmission time of the uplink sub-frame k of the backhaul link of the RN is aligned with a reception time of a downlink sub-frame k of the backhaul link of the RN. $\Delta_{DL}$ illustrated in FIG. 8 represents a time difference between reception and transmission of the sub-frame k at the eNB. Particularly, the sub-frame k includes the PRACH of the RN. The eNB determines the $TAC_{DL}$ through quantifying the $\Delta_{DL}$. For example, in the 3GPP LTE or LTE-A, a quantification step of a TAC is 16Ts, wherein Ts=1/(15000*2048) second represents the minimum time unit of the system. Then $TAC_{DL}$=ceil $(\Delta_{DL}/((16Ts)/2))$ or $TAC_{DL}$=floor $(\Delta_{DL}/((16Ts)/2))$.

It shall be noted that it is assumed in FIG. 8 that the transmission time of the uplink sub-frame k of the backhaul link of the RN is aligned with the reception time of the downlink sub-frame k of the backhaul link of the RN when the RN transmits the PRACH in the sub-frame of the backhaul link. If there is an interval d between the transmission time of the uplink sub-frame k of the backhaul link of the RN and the reception time of the downlink sub-frame k of the backhaul link of the RN, the eNB shall know the magnitude of the d and the d is taken into account when the $TAC_{DL}$ is calculated. For example in a TD system, the transmission timing of the uplink sub-frame k is ahead of the reception time of the downlink sub-frame k by 624Ts, and the eNB shall take this value into account when calculating the timing advance of the uplink sub-frame of the backhaul link of the RN.

The $TAC_{DL}$ determined by the base station through the PRACH transmitted from the relay node in the backhaul link can be transmitted to the relay node in an msg2 of an RACH procedure or to the relay node in upper-layer signaling (e.g., RRC signaling). The relay node can calculate $TA_{DL}$=16*$TAC_{DL}$*Ts after receiving the $TAC_{DL}$. $TAC_{DL}$ can be represented by 11 bits.

Similarly, the base station can determine the $TAC_{UL}$, and transmit the $TAC_{UL}$ to the relay node. The relay node determines the $TA_{UL}$ after receiving the $TAC_{UL}$. It shall be noted that the value of the $TAC_{UL}$ can be different from the value of the $TAC_{DL}$ based on different implementations of the base station. Thus the base station shall notify the relay node of both the $TAC_{UL}$ and the $TAC_{DL}$.

The base station can determine the $TAC_{DL}$ and the $TAC_{DL}$ through the PRACH transmitted from the relay node in the backhaul link. The RN can determine initial values of the $TA_{UL}$ and the $TA_{DL}$ respectively through the $TAC_{UL}$ and the $TAC_{DL}$. The base station can further adjust the values of the $TA_{UL}$ and the $TA_{DL}$ through subsequent TACs to control the uplink transmission time of the backhaul link of the RN and the downlink transmission time of the access link of the RN. For example, the base station can adjust the $TA_{UL}$ and the $TA_{DL}$ respectively through two separate cumulative timing commands $TAC_{UL}$ and $TAC_{DL}$. Specifically, the RN updates $TA_{ULnew}=TA_{ULold}+(TAC_{UL}-31)*16*Ts$ after receiving the $TAC_{UL}$, and the RN updates $TA_{DLnew}=TA_{DLold}+(TAC_{DL}-31)*16*Ts$ after receiving the $TAC_{DL}$, where it is assumed that the $TAC_{UL}$ and the $TAC_{DL}$ are represented by 6 bits and the unit is 16Ts. In another example, the base station can adjust the $TA_{UL}$ and the $TA_{DL}$ concurrently through a single cumulative timing command TAC. Specifically, the RN updates $TA_{ULnew}=TA_{ULold}+(TAC-31)*16*Ts$ and $TA_{DLnew}=TA_{DLold}+(TAC-31)*16*Ts$ after receiving the TAC, where it is assumed that the TAC is represented by 6 bits and the unit is 16Ts.

The base station can notify the RN of a TAC through the PRACH transmitted from the RN in the backhaul link. The RN can determine initial values of the $TA_{UL}$ and the $TA_{DL}$ respectively after receiving the TAC. For example, TAC=ceil ($\Delta_{DL}/((16Ts)/2)$) or $TAC_{DL}$=floor ($\Delta_{DL}/((16Ts)/2)$), and then $TA_{DL}=16*TAC*Ts$ and $TA_{UL}=32*TAC*Ts$. In another example, TAC=ceil ($\Delta_{DL}/(16Ts)$) or $TAC_{DL}$=floor ($\Delta_{DL}/(16Ts)$), and then $TA_{DL}=8*TAC*Ts$ and $TA_{UL}=16*TAC*Ts$. Furthermore, the base station can adjust the $TA_{UL}$ and the $TA_{DL}$ respectively through two separate cumulative timing commands $TAC_{UL}$ and $TAC_{DL}$. Specifically, the RN updates $TA_{ULnew}=TA_{ULold}+(TAC_{UL}-31)*16*Ts$ after receiving the $TAC_{UL}$, and the RN updates $TA_{DLnew}=TA_{DLold}+(TAC_{DL}-31)*16*Ts$ after receiving the $TAC_{DL}$, where it is assumed that the $TAC_{UL}$ and the $TAC_{DL}$ are represented by 6 bits and the unit is 16Ts. In another example, the base station can adjust the $TA_{UL}$ and the $TA_{DL}$ concurrently through a single cumulative timing command TAC. Specifically, the RN updates $TA_{ULnew}=TA_{ULold}+(TAC-31)*16*Ts$ and $TA_{DLnew}=TA_{DLold}+(TAC-31)*16*Ts$ after receiving the TAC, where it is assumed that the TAC is represented by 6 bits and the unit is 16Ts.

The eNB shall transmit the $TAC_{UL}$ and the $TAC_{DL}$ after the relay node initiates initial access as a UE. In a specific process, the relay node initiates random access, and the eNB feeds back a message including the $TAC_{UL}$, and at this time, the eNB doesn't know whether a received random access sequence is transmitted from the relay node or from the UE. The relay node shall be registered with a core network after accomplishing a random access procedure, and at this time, its authentication information indicates its identity of being a relay node. The eNB calculates the $TA_{DL}$ and transmits the $TAC_{DL}$ command to the relay node after determining that the eNB is currently in communication with the relay node, and the relay node adjusts the downlink timing of the access link according to the $TAC_{DL}$ command.

As an alternative, the eNB requests the relay node for reinitiating the random access and also feeds back the $TAC_{UL}$ and the $TAC_{DL}$ commands for use in timing adjustment by the relay node after determining that the eNB is currently in communication with the relay node.

The $TAC_{DL}$ is a new timing command, but its specific design can refer to all the designs of the $TAC_{UL}$ except for some possible differences in specific timing precisions and ranges of values, and thus specific information can be represented by using different numbers of bits.

For a timing advance adjustment command received in the sub-frame k, the command can be applied starting from a sub-frame k+n. For example, for the uplink of the backhaul link, the timing advance adjustment command is received in the sub-frame k and new timing adjustment shall be applied starting from the sub-frame k+n; and for the downlink transmission timing of the access link, the timing advance adjustment command is received in the sub-frame k and new timing shall be applied starting from the sub-frame k+n. The value of n is 6 in the existing system. The value of n can be adjusted according to a specific condition but will not be limited to 6 in an application of the present invention.

Embodiments are given below:

First Embodiment:

In this embodiment, a base station generates an uplink timing adjustment command $TAC_{UL}$ and a downlink transmission timing adjustment command $TAC_{DL}$ of an access link according to a random access signal transmitted from a relay node in an initial access procedure, particularly as follows:

At the base station side:

Step 1: The base station detects a PRACH and feeds back the $TAC_{UL}$ to the relay node; and Step 2: The base station calculates the $TAC_{DL}$ according to the detected random access signal and feeds back the $TAC_{DL}$ to the relay node when determining that the current communication object is the relay node.

At the relay node side:

Step 1: The relay node detects random access feedback information of the base station after initiating random access through a PRACH;

Step 2: The relay node adjusts uplink transmission timing of a backhaul link according to the $TAC_{UL}$ after detecting the random access feedback information; and Step 3: The relay node receives the $TAC_{DL}$ transmitted from the base station and adjusts downlink transmission timing of the present relay node according to the $TAC_{DL}$.

Second Embodiment:

In this embodiment, a base station generates an uplink timing adjustment command $TAC_{UL}$ and a downlink transmission timing adjustment command $TAC_{DL}$ of an access link according to a random access signal transmitted from a relay node in response to an instruction of the base station in a normal communication procedure, particularly as follows:

At the base station side:

Step 1: The base station transmits a random access instruction command to the relay node;

Step 2: The base station detects the random access signal transmitted from the corresponding relay node over a PRACH and calculates the $TAC_{UL}$ and the $TAC_{DL}$ according to the detected random access signal; and Step 3: The base station feeds back the $TAC_{UL}$ and the $TAC_{DL}$ to the relay node.

At the relay node side:

Step 1: The relay node initiates random access through the PRACH after receiving the random access instruction command of the base station;

Step 2: The relay node detects random access feedback information of the base station and obtains the $TAC_{UL}$ and the $TAC_{DL}$;

Step 3: The relay node adjusts uplink transmission timing of a backhaul link according to the $TAC_{UL}$; and Step 4: The relay node adjusts downlink transmission timing of the present relay node according to the $TAC_{DL}$.

Third Embodiment:

In this embodiment, a base station generates a single cumulative timing adjustment command TAC according to a signal transmitted from a relay node in a normal communication procedure, particularly as follows:

At the base station side:

Step 1: The base station calculates a TACa according to the signal transmitted from the relay node; and Step 2: The base station transmits the TACa to the relay node.

At the relay node side:

Step 1: The relay node receives the TACa; and

Step 2: The relay node adjusts uplink transmission timing of a backhaul link and downlink transmission timing of the present relay node according to the TACa.

Fourth Embodiment:

In this embodiment, a base station generates two cumulative timing adjustment commands $TAC_{DLa}$ and $TAC_{ULa}$ according to a signal transmitted from a relay node in a normal communication procedure, particularly as follows:

At the base station side:

Step 1: The base station calculates the $TAC_{ULa}$ according to the signal transmitted from the relay node;

Step 2: The base station calculates the $TAC_{DLa}$ according to the signal transmitted from the relay node; and Step 3: The base station transmits the $TAC_{DLa}$ and the $TAC_{ULa}$ to the relay node.

At the relay node side:

Step 1: The relay node receives the $TAC_{DLa}$ and the $TAC_{ULa}$; and

Step 2: The relay node adjusts uplink transmission timing of a backhaul link according to the $TAC_{ULa}$ and downlink transmission timing of the present relay node according to the $TAC_{DLa}$.

Figure 9:
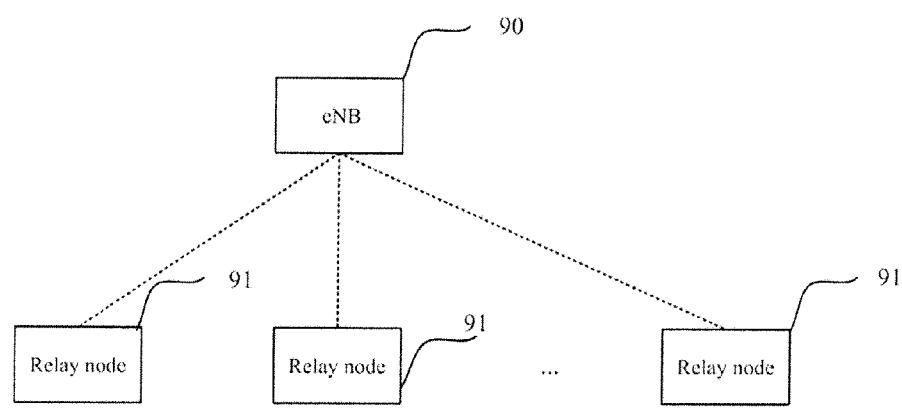
FIG. 9 is a schematic structural diagram of a system according to an embodiment of the invention.

Referring to FIG. 9, an embodiment of the invention further provides an LTE-A communication system including:

A base station 90 configured to transmit a downlink transmission timing adjustment command of an access link to a relay node, wherein the downlink transmission timing adjustment command of the access link is a command by which the relay node adjusts its own downlink transmission timing so that the downlink transmission timing of the access link of the relay node is synchronized with downlink transmission timing of the base station; and The relay node 91 configured to receive the downlink transmission timing adjustment command of the access link and to adjust the downlink transmission timing of the present relay node according to the downlink transmission timing adjustment command of the access link.

Figure 10:
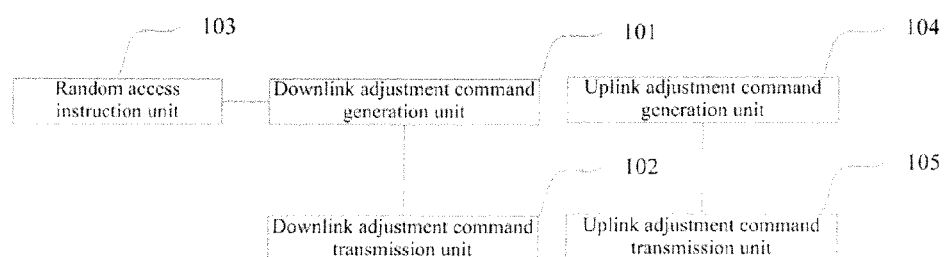
FIG. 10 is a schematic structural diagram of an eNB according to an embodiment of the invention.

Referring to FIG. 10, an embodiment of the invention further provides a base station which can be applied to the foregoing LTE-A communication system and which includes:

A downlink adjustment command generation unit 101 configured to generate a downlink transmission timing adjustment command of an access link, wherein the downlink transmission timing adjustment command of the access link is a command by which a relay node adjusts its own downlink transmission timing so that the downlink transmission timing of the access link of the relay node is synchronized with downlink transmission timing of the base station; and A downlink adjustment command transmission unit 102 configured to transmit the downlink transmission timing adjustment command of the access link to the relay node to instruct the relay node to adjust the downlink transmission timing of the present relay node according to the downlink transmission timing adjustment command of the access link.

The downlink adjustment command generation unit 101 is configured:

To generate the downlink transmission timing adjustment command of the access link according to a reception time when a signal transmitted from the relay node is received.

The downlink adjustment command generation unit 101 is configured:

To generate the downlink transmission timing adjustment command of the access link according to a reception time when a random access signal is received, which is transmitted over a Physical Random Access Channel (PRACH) from the relay node in an initial access procedure; or To generate the downlink transmission timing adjustment command of the access link according to a reception time when another signal, than the random access signal, transmitted from the relay node is received.

The base station further includes:

A random access instruction unit 103 configured to transmit a random access instruction command to the relay node; and Correspondingly the downlink adjustment command generation unit 101 is configured:

To receive a random access signal transmitted over a PRACH from the relay node after receiving the random access instruction command and to generate the downlink transmission timing adjustment command of the access link according to a reception time when the random access signal is received.

The downlink adjustment command generation unit 101 includes:

A time difference determination unit configured to determine a time difference $\Delta_{DL}$ between the time when the signal transmitted from the relay node in an uplink sub-frame k is received and a starting time of the sub-frame k of the present base station;

A quantification unit configured to quantify the time difference or a half of the time difference by a quantification step to obtain timing advance quantification data; and A generation unit configured to generate the downlink transmission timing adjustment command of the access link representing the timing advance quantification data.

The downlink adjustment command generation unit 101 further includes:

A revision unit configured to revise the time difference by a value d after determining the time difference and before quantifying the time difference or the half of the time difference by the quantification step;

Wherein d represents a difference between the starting time of an uplink sub-frame k of a backhaul link of the relay node and a starting time of a downlink sub-frame k of the backhaul link of the relay node.

The quantification step is 16*Ts, where Ts is the minimum time unit of the LTE-A system.

The base station further includes:

An uplink adjustment command generation unit 104 configured to generate an uplink timing adjustment command, wherein the uplink timing adjustment command is a command by which the relay node adjusts uplink transmission timing of a backhaul link so that uplink transmission of the backhaul link is kept synchronization with uplink reception of the backhaul link; and An uplink adjustment command transmission unit 105 configured to transmit the uplink timing adjustment command to the relay node to instruct the relay node to adjust the uplink transmission timing of the backhaul link according to the uplink timing adjustment command.

The downlink adjustment command transmission unit 102 is configured:

To transmit the downlink transmission timing adjustment command of the access link to the relay node by a message 2 or upper-layer signaling in a random access procedure when the signal is the random access signal.

Figure 11:
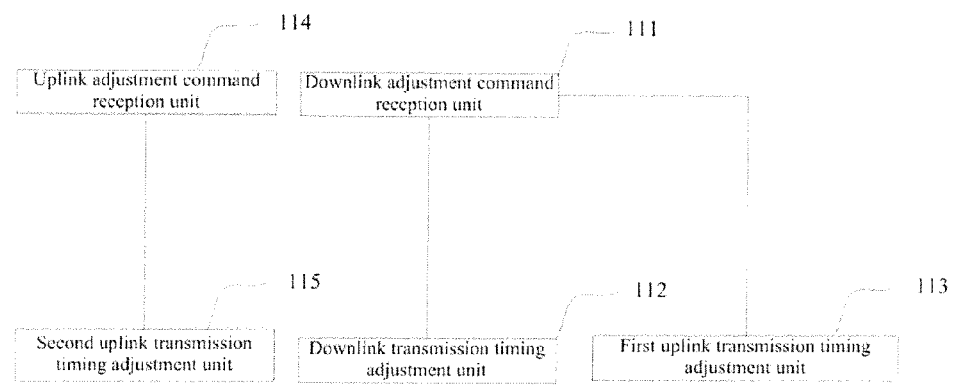
FIG. 11 is a schematic structural diagram of an RN according to an embodiment of the invention.

Referring to FIG. 11, an embodiment of the invention further provides a relay node which can be applied to the foregoing LTE-A communication system and which includes:

A downlink adjustment command reception unit 111 configured to receive a downlink transmission timing adjustment command of an access link transmitted from a base station, wherein the downlink transmission timing adjustment command of the access link is a command by which the relay node adjusts its own downlink transmission timing so that the downlink transmission timing of the access link of the relay node is synchronized with downlink transmission timing of the base station; and A downlink transmission timing adjustment unit 112 configured to adjust the downlink transmission timing of the present relay node according to the downlink transmission timing adjustment command of the access link.

The downlink transmission timing adjustment unit 112 includes:

A downlink timing advance determination unit configured to determine a timing advance of downlink transmission of the present relay node according to the downlink transmission timing adjustment command of the access link; and A timing adjustment unit configured to adjust the downlink transmission timing of the present relay node according to the timing advance.

The downlink timing advance determination unit is configured:

To determine the Timing Advance (TA) of downlink transmission of the present relay node in Formula 1 or Formula 2 below if the relay node receives the downlink transmission timing adjustment command of the access link transmitted from the base station after initiating random access:

$$TA=TAC*K;\quad\quad\text{Formula 1}$$

$$TA=TAC*(K/2);\quad\quad\text{Formula 2}$$

Where TAC represents timing advance quantification data represented by the downlink transmission timing adjustment command of the access link, and K represents a quantification step used by the base station to derive the timing advance quantification data.

The downlink timing advance determination unit is configured:

To determine the Timing Advance (TA) of downlink transmission of the present relay node in Formula 3 or Formula 4 below if the relay node receives the downlink transmission timing adjustment command of the access link transmitted from the base station after accomplishing random access:

$$TA=TA_{old}+(TAC-2^{N-1})*K;\quad\quad\text{Formula 3}$$

$$TA=TA_{old}+(TAC-(2^{N-1}-1))*(K/2);\quad\quad\text{Formula 4}$$

Where TAC represents timing advance quantification data represented by the downlink transmission timing adjustment command of the access link, K represents a quantification step used by the base station to derive the timing advance quantification data, N represents the number of bits used by the downlink transmission timing adjustment command of the access link, and $TA_{old}$ represents a timing advance of downlink transmission of the present relay node recently determined by the relay node before receiving the downlink transmission timing adjustment command of the access link.

The quantification step is 16*Ts, where Ts represents the minimum time unit of the LTE-A system.

The relay node further includes:

A first uplink transmission timing adjustment unit 113 configured to adjust uplink transmission timing of a backhaul link according to the downlink transmission timing adjustment command of the access link.

The relay node further includes:

An uplink adjustment command reception unit 114 configured to receive an uplink timing adjustment command transmitted from the base station, wherein the uplink timing adjustment command is a command by which the relay node adjusts uplink transmission timing of a backhaul link so that uplink transmission of the backhaul link is kept synchronization with uplink reception of the backhaul link; and A second uplink transmission timing adjustment unit 115 configured to adjust the uplink transmission timing of the backhaul link according to the uplink timing adjustment command.

The downlink transmission timing adjustment unit 112 is configured:

To adjust the downlink transmission timing of the present relay node starting from a sub-frame k+n when the downlink adjustment command reception unit receives the downlink transmission timing adjustment command of the access link in a sub-frame k, where n is a positive integer.

In summary, advantageous effects of the invention include:

In the solutions according to the embodiments of the invention, a base station transmits a downlink transmission timing adjustment command of an access link to a relay node, wherein the downlink transmission timing adjustment command of the access link is a command by which the relay node adjusts its own downlink transmission timing so that the downlink transmission timing of the access link of the relay node is synchronized with downlink transmission timing of the base station; and the relay node receives the downlink transmission timing adjustment command of the access link and adjusts the downlink transmission timing of the present relay node according to the downlink transmission timing adjustment command of the access link. As can be apparent in the invention, the base station transmits the downlink transmission timing adjustment command of the access link, and the relay nodes adjusts the downlink transmission timing of the present relay node according to the downlink transmission timing adjustment command of the access link so that downlink transmission of the base station can be synchronized with downlink transmission of the RN. Thus efficient implementation of the relay node participating in a Multicast Broadcast Single Frequency Network (MBSFN) service, a coordinated transmission service and an Inter-Cell Interference Coordination (ICIC) algorithm can be ensured in both a TDD system and an FDD system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory and an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:

1. A method of transmitting a timing adjustment command in an Advanced Long Term Evolution, LTE-A, system, the method comprising:
   generating, by a base station, a downlink transmission timing adjustment command of an access link according to a reception time when a signal transmitted from a relay node is received;
   transmitting, by the base station, the downlink transmission timing adjustment command of the access link to the relay node; and
   the downlink transmission timing adjustment command of the access link is a command by which the relay node adjusts its own downlink transmission timing so that the downlink transmission timing of the access link of the relay node is synchronized with downlink transmission timing of the base station;
   wherein generating, by the base station, the downlink transmission timing adjustment command of the access link according to the reception time when the signal transmitted from the relay node is received comprises:
      determining, by the base station, a time difference $\Delta_{DL}$ between the time when the signal transmitted from the relay node in an uplink sub-frame k is received and a starting time of the sub-frame k of the present base station;
      quantifying, by the base station, a half of the time difference by a quantification step to obtain timing advance quantification data; and
      generating the downlink transmission timing adjustment command of the access link representing the timing advance quantification data.

2. The method according to claim 1, wherein generating, by the base station, the downlink transmission timing adjustment command of the access link according to the reception time when the signal transmitted from the relay node is received comprises:
   generating, by the base station, the downlink transmission timing adjustment command of the access link according to a reception time when a random access signal is received, which is transmitted over a Physical Random Access Channel, PRACH, from the relay node in an initial access procedure; or
   generating, by the base station, the downlink transmission timing adjustment command of the access link according to a reception time when another signal, than a random access signal, transmitted from the relay node is received.

3. The method according to claim 2, wherein the base station transmits the downlink transmission timing adjustment command of the access link to the relay node by a random access response or upper-layer signaling in a random access procedure.

4. The method according to claim 1, wherein after the base station determines the time difference and before quantifying the half of the time difference by the quantification step, the method further comprises:
   revising the time difference by a value d, wherein d represents a difference between the starting time of the uplink sub-frame k of a backhaul link of the relay node and a starting time of a downlink sub-frame k of the backhaul link of the relay node.

5. The method according to claim 1, wherein the quantification step is 16*Ts, and Ts is the minimum time unit of the LTE-A system.

6. A synchronization method in an Advanced Long Term Evolution, LTE-A, system, the method comprising:
   receiving, by a relay node, a downlink transmission timing adjustment command of an access link transmitted from a base station; and
   adjusting, by the relay node, downlink transmission timing of the present relay node according to the downlink transmission timing adjustment command of the access link;
   wherein the downlink transmission timing adjustment command of the access link is generated by the base station according to a reception time when a signal transmitted from the relay node is received, wherein the generating operation comprises:
      determining a time difference $\Delta_{DL}$ between the time when the signal transmitted from the relay node in an uplink sub-frame k is received and a starting time of the sub-frame k of the present base station;
      quantifying a half of the time difference by a quantification step to obtain timing advance quantification data; and
      generating the downlink transmission timing adjustment command of the access link representing the timing advance quantification data.

7. The method according to claim 6, wherein adjusting, by the relay node, the downlink transmission timing of the present relay node according to the downlink transmission timing adjustment command of the access link comprises:
   determining, by the relay node, a timing advance of downlink transmission of the present relay node according to the downlink transmission timing adjustment command of the access link and adjusting, by the relay node, the downlink transmission timing of the present relay node according to the timing advance.

8. The method according to claim 7, wherein the relay node determines the Timing Advance, TA, of downlink transmission of the present relay node in Formula 1 below if the relay node receives the downlink transmission timing adjustment command of the access link transmitted from the base station after initiating a random access procedure:

$$TA = TAC*K; \quad \text{Formula 1}$$

wherein TAC represents timing advance quantification data represented by the downlink transmission timing adjustment command of the access link, and K represents a quantification step used by the base station to derive the timing advance quantification data.

9. The method according to claim 8, wherein the quantification step is 16*Ts, and Ts represents the minimum time unit of the LTE-A system.

10. The method according to claim 7, wherein the relay node determines the Timing Advance, TA, of downlink transmission of the present relay node in Formula 3 below if the relay node receives the downlink transmission timing adjustment command of the access link transmitted from the base station after accomplishing a random access procedure:

$$TA = TA_{old} + (TAC - 2N - 1)*K; \quad \text{Formula 3}$$

wherein TAC represents timing advance quantification data represented by the downlink transmission timing adjustment command of the access link, K represents a quantification step used by the base station to derive the timing advance quantification data, N represents the number of bits used by the downlink transmission timing adjustment command of the access link, and $TA_{old}$ represents a timing advance of downlink transmission of the present relay node recently determined by the relay node before receiving the downlink transmission timing adjustment command of the access link.

11. The method according to claim 7, wherein adjusting the downlink transmission timing of the present relay node according to the timing advance comprises:
adjusting, by the relay node, the downlink transmission timing of the present relay node starting from a sub-frame k+n when receiving the downlink transmission timing adjustment command of the access link in a sub-frame k, wherein n is a positive integer.

12. The method according to claim 6, wherein after the relay node receives the downlink transmission timing adjustment command of the access link transmitted from the base station, the method further comprises:
adjusting, by the relay node, uplink transmission timing of a backhaul link according to the downlink transmission timing adjustment command of the access link.

13. A relay node, comprising:
a downlink adjustment command reception unit configured to receive a downlink transmission timing adjustment command of an access link transmitted from a base station; and
a downlink transmission timing adjustment unit configured to adjust downlink transmission timing of the present relay node according to the downlink transmission timing adjustment command of the access link;
wherein the downlink transmission timing adjustment command of the access link is generated by the base station according to a reception time when a signal transmitted from the relay node is received, wherein the generating operation comprises:
determining a time difference $\Delta_{DL}$ between the time when the signal transmitted from the relay node in an uplink sub-frame k is received and a starting time of the sub-frame k of the present base station;
quantifying a half of the time difference by a quantification step to obtain timing advance quantification data; and
generating the downlink transmission timing adjustment command of the access link representing the timing advance quantification data.

14. The relay node according to claim 13, wherein the downlink transmission timing adjustment unit comprises:
a downlink timing advance determination unit configured to determine a timing advance of downlink transmission of the present relay node according to the downlink transmission timing adjustment command of the access link; and
a timing adjustment unit configured to adjust the downlink transmission timing of the present relay node according to the timing advance.

15. The relay node according to claim 14, wherein the downlink timing advance determination unit is configured:
to determine the Timing Advance, TA, of downlink transmission of the present relay node in Formula 1 below if the relay node receives the downlink transmission timing adjustment command of the access link transmitted from the base station after initiating a random access procedure:

$$TA = TAC*K; \quad \text{Formula 1}$$

wherein TAC represents timing advance quantification data represented by the downlink transmission timing adjustment command of the access link, and K represents a quantification step used by the base station to derive the timing advance quantification data.

16. The relay node according to claim 14, wherein the downlink timing advance determination unit is configured:
to determine the Timing Advance, TA, of downlink transmission of the present relay node in Formula 3 below if the relay node receives the downlink transmission timing adjustment command of the access link transmitted from the base station after accomplishing a random access procedure:

$$TA = TA_{old} + (TAC - 2N - 1)*K; \quad \text{Formula 3}$$

wherein TAC represents timing advance quantification data represented by the downlink transmission timing adjustment command of the access link, K represents a quantification step used by the base station to derive the timing advance quantification data, N represents the number of bits used by the downlink transmission timing adjustment command of the access link, and $TA_{old}$ represents a timing advance of downlink transmission of the present relay node recently determined by the relay node before receiving the downlink transmission timing adjustment command of the access link.

17. The relay node according to claim 13, further comprising:
a first uplink transmission timing adjustment unit configured to adjust uplink transmission timing of a backhaul link according to the downlink transmission timing adjustment command of the access link.

18. The relay node according to claim 13, wherein the downlink transmission timing adjustment unit is configured:
to adjust the downlink transmission timing of the present relay node starting from a sub-frame k+n when the downlink adjustment command reception unit receives the downlink transmission timing adjustment command of the access link in a sub-frame k, wherein n is a positive integer.

* * * * *

UNITED STATES PATENT AND TRADEMARK OFFICE
CERTIFICATE OF CORRECTION

PATENT NO. : 9,049,706 B2  Page 1 of 1
APPLICATION NO. : 13/701401
DATED : June 2, 2015
INVENTOR(S) : Zhang et al.

It is certified that error appears in the above-identified patent and that said Letters Patent is hereby corrected as shown below:

In the Claims:

Column 15, line 57, claim 1 "$\Delta_{DL}$-" should be -- $\Delta_{DL}$ --.

Column 18, lines 52-53, claim 16 "$TA_{ol\text{-}d}$represents" should be -- $TA_{old}$ represents --.

Signed and Sealed this
Twenty-third Day of February, 2016

Michelle K. Lee
*Director of the United States Patent and Trademark Office*